United States Patent
Siddall et al.

[15] 3,669,996

[45] June 13, 1972

[54] 11-HALO-10-OYO-3,7,11-TRIALKYL-2-ALKENOIC AND 2,6-ALKADIENOIC ACIDS AND ESTERS THEREOF

[72] Inventors: John B. Siddall, 975 California Avenue, Palo Alto, Calif. 94304; Jean Pierre Calame, Brandholzstrasse 1, 8117, Fallanden, Switzerland

[22] Filed: July 2, 1970

[21] Appl. No.: 52,137

Related U.S. Application Data

[63] Division of Ser. No. 23,512, March 27, 1970, which is a continuation-in-part of Ser. No. 666,461, Sept. 8, 1967, abandoned.

[52] U.S. Cl............260/408, 260/247.2 A, 260/268 C, 260/293.86, 260/326.5 E, 260/340.9, 260/345.8, 260/347.4, 260/348.5, 260/404, 260/405, 260/406, 260/408, 260/413, 260/468 B, 260/468 P, 260/468 R, 260/471 R, 260/473 C, 260/476 R, 260/482 R, 260/484, 260/485 H, 260/485 P, 260/485 N, 260/487, 260/488 F, 260/488 H, 260/593 H, 260/593 R, 260/514 P, 260/561 K, 260/614 R, 260/633, 260/946, 260/956, 260/961, 260/312, 260/318, 1068/260

[51] Int. Cl............C07c 69/66, A01n 9/24

[58] Field of Search..........260/408, 406, 410.9 R, 413

[56] References Cited

UNITED STATES PATENTS 3,453,362   7/1969   Cruickshank..........424/84

*Primary Examiner*—Lewis Gotts
*Assistant Examiner*—Diana G. Rivers
*Attorney*—Donald W. Erickson

[57] ABSTRACT

Hydrocarbon carboxylic acids, esters, alcohols, ethers, amides and dialkyl phosphonates with a carbon atom chain length of from 12 to 17 carbon atoms substituted at C-6 and/or C-10 with ketal groups, and which are substituted at C-3, C-7 and C-11 with (lower)alkyl or (lower)alkylidene groups optionally saturated or unsaturated between C-2,3 and/or C-5, 6 or C-6,7 or C-7,8 and/or C-9,10 or C-10,11 or C-11,12, or optionally substituted with fused groupings at C-2,3 and/or c-6,7 or C-10,11 and optionally substituted at each of positions C-2,3,6,7,10 and 11, are arthropod maturation inhibitors.

13 Claims, No Drawings

11-HALO-10-OYO-3,7,11-TRIALKYL-2-ALKENOIC AND 2,6-ALKADIENOIC ACIDS AND ESTERS THEREOF

This is a continuation of application, Ser. No. 23,512, filed Mar. 27, 1970, which is a continuation-in-part of application, Ser. No. 666,461, filed Sept. 8, 1967, now abandoned.

The present invention relates to certain novel keto compounds and to processes for their preparation.

More specifically, the present invention is directed to certain novel organic keto compounds that inhibit the maturation of arthropods.

The novel compound of the present invention can be represented by the following structural formulas:

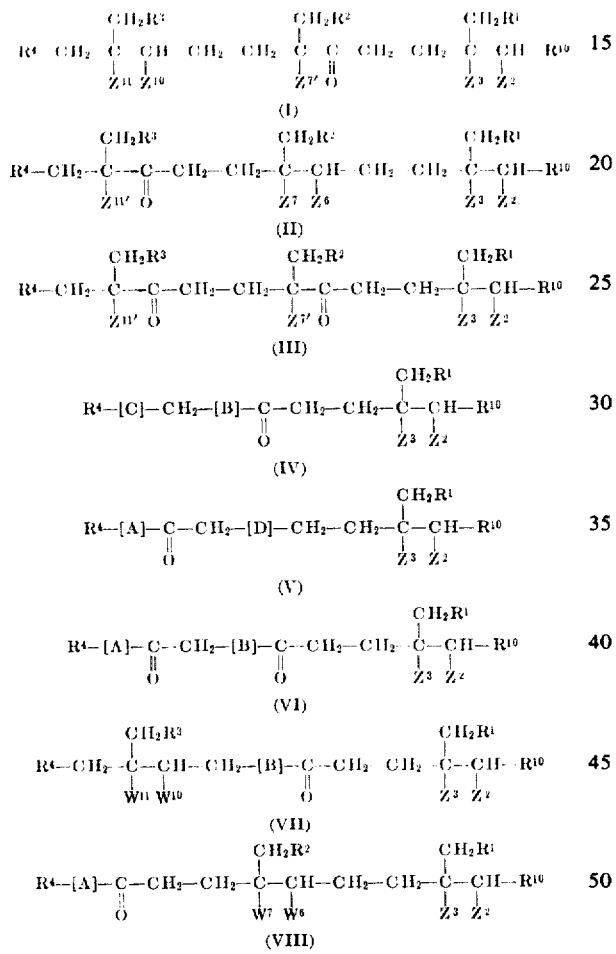

wherein [A] is one of the group

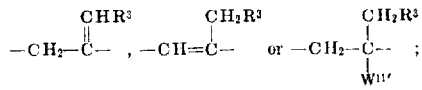

[B] is one of the group

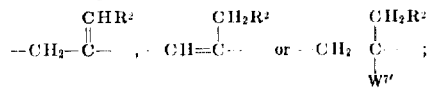

[C] is one of the group

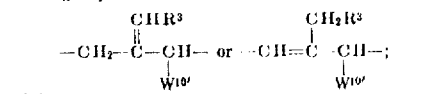

[D] is one of the group

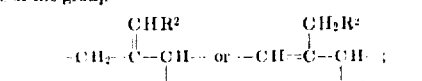

each of $R^1$, $R^2$, $R^3$ and $R^4$ is hydrogen or (lower) alkyl;
$R^{10}$ is the group $COOR^{11}$, $CH_2R^{12}$, $CONR^{13}R^{14}$, or $CH_2PO(OR^{15})_2$;

$R^{11}$ is hydrogen, alkyl or an alkali metal cation;

$R^{12}$ is hydroxy, conventional hydrolyzable ether, or a conventional hydrolyzable ester;

each of $R^{13}$ and $R^{14}$ is hydrogen, (lower) alkyl, (lower) hydroxy alkyl, (lower) alkoxyalkyl or phenyl;

$R^{13}$ and $R^{14}$ when taken together with the nitrogen atom to which they are attached are pyrrolidino, piperidino, morpholino, piperazino or a 4'-(lower)alkyl piperazino group;

$R^{15}$ is (lower)alkyl;

$Z^2$ and $Z^3$ are hydrogen;

each of $W^6$, $W^7$, $W^{10}$, $W^{11}$, $Z^6$, $Z^7$, $Z^{10}$ and $Z^{11}$ is hydrogen, halo of atomic weight less than 81, that is, fluoro, chloro or bromo, hydroxy, a conventional hydrolyzable ether group or a conventional hydrolyzable ester group; provided that $W^6$ or $W^{10}$ is hydrogen, halo or hydroxy when $W^7$ or $W^{11}$ respectively is a conventional hydrolyzable ether group or a conventional hydrolyzable ester group, and further provided that both $W^6$ and $W^7$, or both $W^{10}$ and $W^{11}$ respectively are not simultaneously halo;

each of $W^6$ and $W^{10}$ is hydrogen, hydroxy, a conventional hydrolyzable ether group or a conventional hydrolyzable ester group;

each of $W^{7\prime}$ and $W^{11\prime}$ is hydrogen, a conventional hydrolyzable ether group or a conventional hydrolyzable ester group; provided $W^{7\prime}$ is hydrogen in the compounds of formula (VII), $W^{11\prime}$ is hydrogen in the compounds of formula (VIII) and one or both of $W^{7\prime}$ and $W^{11\prime}$ is hydrogen in the compounds of formula (VI);

each of $Z^{7\prime}$ and $Z^{11\prime}$ is halo of atomic weight less than 81, that is, fluoro, chloro or bromo, a conventional hydrolyzable ether group or a conventional hydrolyzable ester group; provided that $Z^6$ or $Z^{10}$ is hydrogen, halo or hydroxy when $Z^7$ or $Z^{11}$ respectively is a conventional hydrolyzable ether group or a conventional hydrolyzable ester group;

each of $Z^6$ and $Z^{10}$ is hydrogen when each of $Z^7$ and $Z^{11}$, respectively, is hydrogen;

$Z^2$ and $Z^3$ when taken together are a carbon-carbon double bond or one of the group

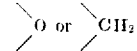

$W^6$ and $W^7$ when taken together, or $W^{10}$ and $W^{11}$ when taken together, or $Z^6$ and $Z^7$ when taken together, or $Z^{10}$ and $Z^{11}$ when taken together, are a carbon-carbon double bond or one of the groups

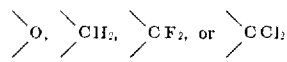

In order to facilitate the description of the present invention, the carbon atoms in the above formulas are numbered from right to left from C-2 to C-12. The initial carbon atom of $R^{10}$ is C-1. The three carbons above the backbone and connected to the backbone at C-3, C-7 and C-11, and connected to $R^1$, $R^2$ and $R^3$ respectively are numbered C-3', C-7' and C-11' respectively from right to left. The backbone of the present novel keto compounds is the carbon atom chain made up of carbon atoms C-1 through C-12, including C-11'. Thus, in the above formulas, $R^1$ is bonded to the C-3' carbon atom, which in turn is bonded to the C-3 carbon atom of the backbone of the present novel keto compounds. $R^2$ is bonded to the C-7' carbon atom, which in turn is bonded to the C-7 carbon atom, which in turn is bonded to the C-6 carbon atom on its right and the C-8 carbon atom on its left.

Where two adjacent carbon atoms, such as C-6 and C-7, or C-10 and C-11, are both substituted with halo atoms (i.e. $Z^6$ and $Z^7$, or $Z^{10}$ and $Z^{11}$ being halo), the halo atoms are preferably the same.

The present novel keto compounds have a keto group at the C-6 and/or C-10 carbon atoms. Included within the scope of the present compounds of formulas I-VIII are carboxylic acids and the esters and alkali metal salts thereof ($R^{10}$ being $COOR^{11}$ where $R^{11}$ is hydrogen, alkyl or an alkali metal cation); alcohols and esters and ethers thereof ($R^{10}$ being $CH_2R^{12}$, where $R^{12}$ is hydroxy, or conventional ether or ester group, and the like); unsubstituted, monosubstituted, disubstituted amides ($R^{10}$ being $CONR^{13}R^{14}$ where each of $R^{13}$ and $R^{14}$ is hydrogen or other than hydrogen); and dialkyl phosphonates thereof [$R^{10}$ being $CH_2PO(OR^{15})$, where $R^{15}$ is alkyl].

In addition, the C-6, C-7, C-10 and C-11 carbon atoms are optionally substituted with groups (such as $W^6$, $W^{6'}$, $W^7$, $W^{7'}$, $W^{10}$, $W^{10'}$, $W^{11}$, $W^{11'}$, $Z^6$, $Z^7$, $Z^{7'}$, $Z^{10}$, $Z^{11}$, $Z^{11'}$, and the like) other than hydrogen, as for example, hydroxy groups, conventional hydrolyzable ester groups and the like.

Obviously, a carbon atom in the present novel unsaturated compounds is bonded only to one other carbon atom by a double bond or a fused grouping. For example, when the C-6 and C-7 carbon atoms are bonded by a carbon-carbon double bond, the C-7 and C-8 carbon atoms and the C-7 and C-7' carbon atoms are bonded by carbon-carbon single bonds.

The presence of double bonds and fused groupings gives rise to geometric isomerism in the configuration of these compounds. This isomerism occurs with regard to the double bond or fused grouping bridging the C-2,3 carbon atoms, the C-6,7 carbon atoms, and the C-10,11 carbon atoms or to the double bond bonding the C-7,8 or the C-7,7' carbon atoms and/or the C-11,11' or the C-11,12 carbon atoms. Obviously such isomerism occurs only with respect to the C-7,7' carbon atoms when $R^2$ is (lower)alkyl and to the C-11,11' carbon atoms when $R^3$ is (lower)alkyl, and to the C-11,12 carbon atoms when $R^4$ is (lower)alkyl, and to the C-10,11 carbon atoms when $R^3$ and $R^4$ are different groups.

The isomers are the cis and trans of the monoene or single fused grouping series; the cis,cis; cis,trans; trans,cis; and trans,trans of the diene or bis fused grouping series, or combinations thereof, and the eight isomers of the triene or tris fused grouping series, or combinations thereof, each of which isomers in each series being included within the scope of this invention. Each of these isomers is separable from the reaction mixture by which they are prepared by conventional techniques, such as chromatography, including thin-layer, gas-liquid and column chromatography, and the like.

The term "alkyl" denotes a group comprising a straight or branch chain aliphatic hydrocarbon of from one to 12 carbon atoms. Typical of such alkyl are methyl, ethyl, isopropyl, propyl, butyl, pentyl, hexyl, octyl, and the like. When qualified by the term "(lower)" such a group will contain no more than five carbon atoms. Typical of such (lower)alkyl are methyl, ethyl, isopropyl, propyl, isobutyl, butyl, sec-butyl, t-butyl, pentyl, and the like.

The term "(lower)alkylidene" denotes a group comprising a straight or branched chain aliphatic hydrocarbon of from one to six carbon atoms wherein the group is attached by a carbon-carbon double bond. Typical of such alkylidene are methylene, ethylidene, 1-propylidene, 1-butylidene, 2-propylidene, 1-pentylidene, 3-pentylidene, 1-hexylidene, and the like.

The term "(lower)hydroxyalkyl" denotes a group comprising a straight or branched chain aliphatic hydrocarbon of from one to six carbon atoms substituted with one or two hydroxy groups. Typical of such (lower)hydroxyalkyl are hydroxymethyl, β-hydroxyethyl, 6-hydroxyhexyl, and the like.

The term "(lower)alkoxyalkyl" denotes a group comprising a straight or branched chain aliphatic hydrocarbon of from one to eight carbon atoms substituted with an alkoxy group of from one to eight atoms. Typical of such (lower)alkoxyalkyl are methoxymethyl, 2-ethoxyethyl, 3-methoxypropyl, 3-ethoxypropyl, and the like.

The term "(lower)alkoxy" denotes a group comprising a straight chain aliphatic hydrocarbon of from one to five carbon atoms with an oxygen atom bonded to the C-1 carbon atom. Typical of such (lower)alkoxy are methoxy, ethoxy, 1-propoxy, 1-butoxy, and the like.

The term "conventional hydrolyzable ester" as used herein denotes those hydrolyzable ester groups conventionally employed, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon chain. Typical conventional hydrolyzable esters thus included within the scope of the term and the instant invention are formate, acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-ββ-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, and the like.

The term "conventional hydrolyzable ether" as used herein denotes those hydrolyzable ether groups conventionally employed, preferably those derived from normal, branched chain and cyclic hydrocarbons and aromatic hydrocarbons. The term "hydrocarbon" defines both substituted and unsubstituted hydrocarbons. Typical substituted groups include hydroxy, alkoxy containing up to six carbon atoms, acyloxy containing up to 12 carbon atoms, nitro, amino, halo, keto, and the like. These hydrocarbons (except for the aromatic hydrocarbons) can be completely saturated or possess (including aromatic hydrocarbons) varying degrees of unsaturation. Preferably they contain from one to 12 carbon atoms. Typical conventional hydrolyzable ethers thus include methoxy, ethoxy, propoxy, 2-propoxy, cyclopropoxy, butoxy, 2-butoxy, t-butoxy, cyclobutoxy, pentoxy, 3-pentoxy, cyclopentoxy, hexoxy, cyclohexoxy, methylmethylenedioxy, 2-methoxyethoxy, 2-ethoxyethoxy, 2-aminoethoxy, 2-chloroethoxy, 3-fluorobutoxy, 2-acetoxyethoxy, 3-nitropropoxy, 3-aminocyclobutoxy, 4-hexycyclohexoxy, 2-phenoxyethoxy, phenoxy, tolyloxy, chlorophenoxy, m,m'-dimethylphenoxy, p-nitrophenoxy, β-chloropropoxy, p-aminophenoxy, tetrahydrofuran-2'-yloxy, tetrahydropyran-2'-yloxy, and the like.

The compounds of this invention are arthropod maturation inhibitors. They possess the ability to inhibit the maturation of members of the phylum Arthropoda, particularly members of the class Insecta, in the passage from one metamorphic stage to the metamorphic stage. Thus, in the case of insects passing from the embryo stage to the larva stage, thence to the pupa stage, and thence to the adult stage, contact with an effective amount of a compound of the present invention, at any of the first three stages, inhibits passage to the next developmental stage with the insect either repeating passage through its present stage or dying. Moreover, these compounds exhibit ovicidal properties with insects and accordingly are useful in combating insects. These compounds are very potent and thus can be used at extremely low levels, e.g., from $10^{-6}$ to $10^{-9}$ g. and are thus advantageously administered over large areas in quantities suitable for the estimated insect population. Generally the substances are liquids and for the purposes herein described, they can be utilized in conjunction with liquid or solid carriers. Typical insects against which these compounds are effective include mealworm, housefly, boll-weevil, cornborer, mosquito, cockroach, moth, pyrrhocoris, beetle, and the like.

Although not intending to be limited by any theoretical explanation, it appears that the effectiveness of the novel compounds of the present invention can be traced to their ability to mimic the activity of certain so-called "juvenile hormone" substances such as those described in U.S. Pat. No. 2,981,655 and Law et al., Proc. Nat. Acad. Sci., 55 576 (1966). Because of the potency of the compounds of the present invention, they can be employed in extremely low concentrations, as noted above, to obtain reproducible predetermined level of activities.

The present novel keto compounds of formulas (I), (II) & (III) supra are prepared from the corresponding starting hydroxy compounds by any of several alternative chemical processes. One such process, an oxidation, can be illustrated by the following reaction sequence using partial structures:

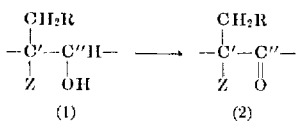

where R is $R^2$ or $R^3$; Z is $W^{7\prime}$ or $Z^{7\prime}$ or $W^{11\prime}$ or $Z^{11\prime}$; C' is the C-7 or C-11 carbon atom, and C'' is the C-6 or C-10 carbon atom.

The novel keto compounds of formulas (I), (II) and (III) are prepared from the corresponding starting hydroxy compounds by oxidizing the latter by conventional techniques known to the art. For example, starting hydroxy compounds can be oxidized with an aqueous mixture of sulfuric acid and chromium trioxide; a mixture of a hydrocarbon carboxylic acid and chronium trioxide; a mixture of a tertiary amine, such as triethylamine, pyridine and the like, and chromium trioxide; a mixture of a dialkyl sulfoxide, such as dimethylsulfoxide; a dialkyl carbodiimide, such as dicyclohexyl carbodiimide, and a mineral acid and/or a hydrocarbon carboxylic acid optionally in a co-solvent such as a pyridine, benzene, methylenechloride, and the like (the Moffatt oxidation), or a mixture of ketones, such as butanone, cyclohexanone, and the like, and a metallic alkoxide, such as sodium t-butoxide (the Oppenauer oxidation).

Sufficient amounts of the oxidizing reagents are employed to oxidize all of the free primary and secondary hydroxy groups present on the starting hydroxy compounds. For example, at least two-thirds molar equivalents of chromium trioxide or one molar equivalent of a dialkyl sulfoxide and the disubstituted carbodiimide or 40 to 80 molar equivalents of ketones and a molar equivalent of a metallic alkoxide are employed for every molar equivalent of free hydroxy group present.

The temperature at which the oxidation is performed will be dependent upon the oxidation method used. For example, the oxidation methods employing chromium trioxide are generally carried out at temperatures of from about −10° C. to about 100° C. While the Moffatt oxidation is generally carried out at temperatures of from about −30° C. to about 110° C., and the Oppenauer oxidation is generally conducted at temperatures of from about 80° C. to about 250° C.

At the completion of the oxidation, the keto compounds are isolated by conventional techniques, such as distillation, chromatography, including gas-liquid chromatography, column chromatography, thin-layer chromatography and the like.

Since all secondary and primary hydroxy groups are oxidized in the above process, hydroxy groups that are not to be oxidized are protected by etherification or esterification by techniques well-known to the art prior to the above process. For example, hydroxy groups are esterified by treatment with acetic anhydride in anhydrous pyridine, and they are etherified by treatment, first, with sodium hydride and, second, with an alkyl halide. The etherified or esterified groups can be hydrolyzed to obtain the free hydroxy groups again by treatment with an aqueous acid solution, and the like, after the oxidation process.

The choice of the protecting group will be governed by the oxidation conditions. Accordingly, if the oxidation is performed under acidic conditions, and ester group will be the protecting group, and if the oxidation conditions are basic, an ether group will be the protecting group.

The starting materials for the present oxidation process are prepared according to the processes described in U.S. Pat. application, Ser. Nos. 618,321, filed Feb. 24, 1967, 618,339, filed February 24, 1967 and 618,351, filed February 24, 1967, each now abandoned.

The starting materials are prepared from the corresponding 2,6,10-trienes of the following formula:

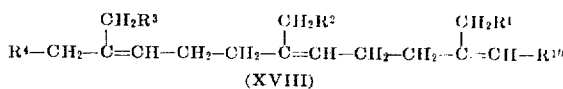

(XVIII)

wherein $R^1 - R^4$ and $R^{10}$ are defined hereinbefore. Several of the trienes of formula (X) are known; the other trienes can be prepared according to the process disclosed in the above-cited co-pending applications. For example, the above trienes are prepared from the appropriate ketones by a series of Wittig reactions which can be illustrated by the following reaction scheme:

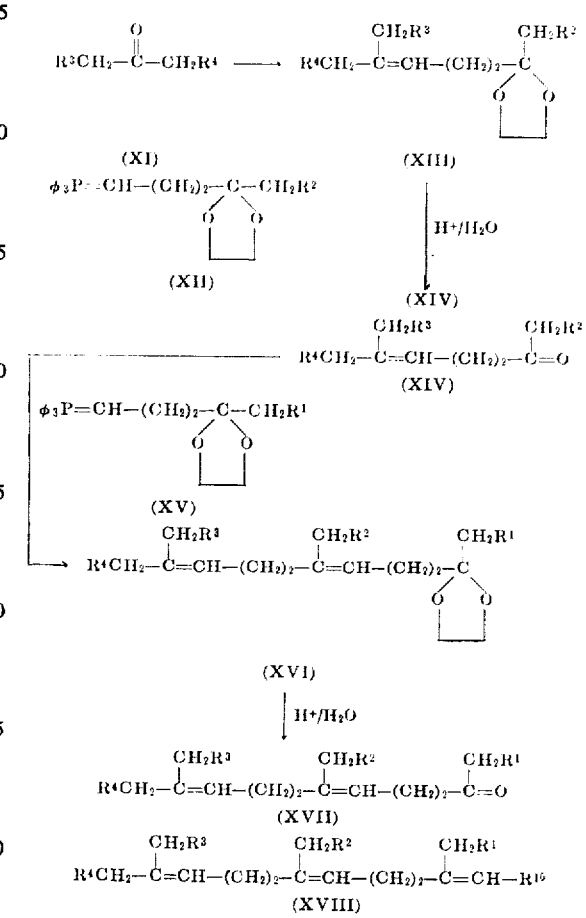

In the above scheme, each of $R^1$, $R^2$, $R^3$, $R^4$ and $R^{10}$ is as hereinbefore defined, and the symbol $\phi$ represents the phenyl group.

With reference to the above reaction scheme, the selected dialkylketone (XI) is permitted to react with the Wittig reagent derivative of formula (XII) to afford the corresponding substituted Wittig reaction adduct of formula (XIII).

Hydrolysis of the Wittig reaction adduct (XIII) with aqueous acid affords the free ketone (XIV). This ketone is allowed to react with the Wittig reagent (XV), affording the corresponding ethylene ketal diene adduct (XVI). The latter is hydrolyzed with aqueous acid to the tetraalkyl substituted dienone (XVII).

The Wittig reagents (XII) and (XV) are prepared by conventional procedures, such as is disclosed by Trippett, Advances in Organic Chemistry, Vol. 1, pp. 83–102, from the appropriate corresponding 4-ethylene ketal upon treatment with triphenylphosphine and treating the resultant phosphonium halide with butyl or phenyl lithium.

The 4-ethylene ketal is prepared from the corresponding 1-halo-4-alkanone obtained by treating the latter with ethylene glycol in the presence of an acid catalyst. The 1-halo-4-alkanone can be prepared by conventional processes, such as described in German Pat. No. 801,276 (Dec. 28, 1950). Briefly, these procedures involve treating butyrolactone with the desired alkyl alkanoate to provide the corresponding α-acylbutyrolactone. Treatment of the latter with alkali metal halide in aqueous sulfuric acid affords the corresponding 1-bromo-4-alkanone.

When the dienes of formula (XVII) are treated with a carbalkoxymethyl phosphonate in the presence of an alkali metal hydride, the corresponding esters of formula (XVIII) where $R^{10}$ is $COOR^{11}$, are obtained. The corresponding free acids are obtained by conventional hydrolysis.

By reduction of the free acids, such as with lithium aluminum hydride, the corresponding alcohols of formula (XI), where $R^{10}$ is $CH_2R^{12}$, are obtained. The hydroxy group is esterified or etherified by conventional techniques.

By treating the above esters with unsubstituted, mono-substituted or disubstituted amines in the presence of an alkali metal alkyl, such as butyl lithium, the corresponding amides of formula (XVIII), where $R^{10}$ is $CONR^{13}R^{14}$, are obtained. The corresponding amine may be obtained by reducing the amide.

By treating the dienes of formula (XVII) with vinyl magnesium bromide, the corresponding 1,6,10-trien-3-ols are obtained. The latter, on treatment with a phosphorous trihalide, furnishes the corresponding 2,6,10-triene-1-halides. The corresponding disubstituted phosphonates of formula (XVIII), where $R^{10}$ is $CH_2PO(OR^{15})_2$, are obtained by treating the above halides with trisubstituted phosphites, such as triethyl phosphite. The corresponding amines of formula (XI), where $R^{10}$ is $CH_2NR^{13}R^{14}$, are obtained by treating the above halide with the appropriate amines.

Oxido groups are introduced by treating the trienes of formula (XVIII) with m-chloroperbenzoic acid in $CH_2Cl_2$ or $CHCl_3$. Methylene groups are introduced by treating the trienes with methylene iodide and a zinc copper couple. Difluoromethylene groups are introduced by treating the trienes with trimethyltrifluoromethyl tin in the presence of sodium iodide. The corresponding dichloromethylene groups are introduced by treating the triene with phenyldichlorobromomethyl mercury.

By treating the oxido derivatives with aqueous perchloric acid, the corresponding dihydroxy compounds are obtained, that is, a 10,11-oxido compound will furnish the corresponding 10,11-dihydroxy derivative; in the presence of an alkanol, the corresponding 10-hydroxy-11-alkoxy derivative is obtained. Treatment of an oxido derivative with a hydrogen halide furnishes the corresponding halo hydroxy groups, that is, a 6,7-oxido compound will furnish a 6-hydroxy-7-halo compound; in the presence of an alkanol, the corresponding 6-alkoxy-7-halo derivative is obtained.

By treating the derivatives of formula (XVIII) with an aqueous mineral acid, the corresponding C-7 and/or C-11 mono- and dihydroxy derivatives are obtained. Treating the derivatives of formula (XVIII) with a hydrogen halide affords the corresponding C-7 and/or C-11 mono- or dihalo derivatives.

Treatment of the derivatives of formula (XVIII) with n-halo succinimide affords a corresponding C-6(10)-halo-C-7(11)-hydroxy derivative. When the reaction is performed in the presence of an alkanol under anhydrous conditions, the corresponding C-6(10)-halo-C-7(11)-alkoxy derivatives are obtained. Alternatively, the hydroxy groups may be etherified by treatment of a diazoalkane and borontrifluoride.

Hydroxy groups are esterified and etherified by conventional techniques.

By treatment of the derivatives of formula (XVIII) with a halide, the double bonds are halogenated yielding the corresponding mono-, bis- or trisdihalo derivatives.

The double bonds of the derivatives of formula (XVIII) are hydrogenated with hydrogen in the presence of a palladium catalyst.

The acid addition salts of the amines are prepared from the amines and the appropriate organic or inorganic acids.

Typical hydroxy starting materials can be represented by the following formulas:

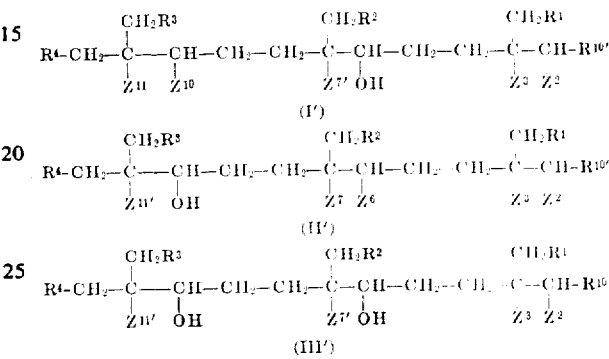

wherein $R^1, R^2, R^3, R^4, Z^2, Z^3, Z^6, Z^7 Z^7, Z^{10}, Z^{11}$ and $Z^{11'}$ are as defined hereinbefore;

$R^{10'}$ is the group $COOR^{11}$, $CH_2R^{12'}$, $CONR^{13}R^{14}$ or $CH_2PO(OR^{15}ch2)$;

$R^{11}, R^{13}, R^{14}$ and $R^{15}$ are as defined hereinbefore;

$R^{12'}$ is a conventional hydrolyzable ether group or a conventional hydrolyzable ester group.

The novel keto compounds of formulas (IV) – (VIII) (supra) are prepared by any of several alternative chemical processes. One such process, a reduction, can be illustrated by the following reaction sequence using partial structures:

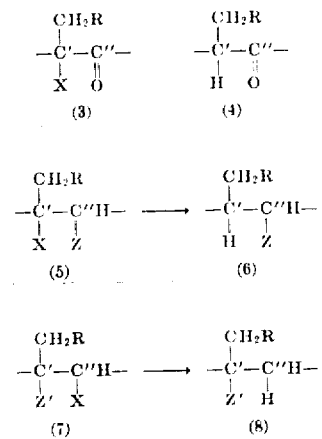

wherein R is $R^2$ or $R^3$;

Z is hydrogen, hydroxy, a conventional hydrolyzable ether group, or a conventional hydrolyzable ester group;

Z' is hydroxy, a conventional hydrolyzable ether group or a conventional hydrolyzable ester group;

X is halo, preferably chloro or bromo;

C' and C'' are the C-7 and C-6 carbon atoms, or the C-11 or C-10 carbon atoms respectively; and $R^2, R^3$, C-6,7,10 and 11, and $W^{11}$ are as defined hereinabove.

The reduction is carried out by treating the corresponding halo-keto compounds of formulas (I), (II) and (III) with a reducing reagent such as zinc metal in a lower hydrocarbon carboxylic acid, e.g., acetic acid, or a lower alkanol, e.g., ethanol or methanol; or neutral Raney nickel in a lower alkanol; or an activated palladium catalyst with hydrogen gas in a lower alkanol or ester, e.g., ethyl acetate, amyl acetate, and the like.

The reduction is generally conducted at temperatures ranging from 10° C. to about 60° C., conveniently at room temperature. The reaction period is dependent upon the reaction conditions. Generally the reaction period is from about 30 minutes to about 48 hours.

When utilizing zinc (generally in the form of zinc dust) as the reducing reagent, at least a molar equivalent of zinc is employed per molar equivalent of halide. When neutral Raney nickel is employed as the reducing reagent, generally about 5 to 20 molar equivalents of neutral Raney nickel are utilized per molar equivalent of halide present. When activated palladium and hydrogen are employed as reducing reagents, generally only a catalytic amount of palladium is utilized (that is, about 0.002 to about 0.02 molar equivalents of activated palladium) and one molar equivalent of hydrogen, per molar equivalent of halide.

When a secondary halide atom [such as is found in partial formula (7)] is to be reduced, neutral Raney nickel in a lower alkanol is the preferred reagent.

When activated palladium and hydrogen are used as reducing reagents in the above process, carbon-carbon double bonds as well as halide atoms will be reduced. Thus, reducing reagents, other than activated palladium and hydrogen, are used when double bonds are to be preserved during the above reduction process.

At the completion of the above reduction process the novel keto compounds are isolated by conventional techniques, such as distillation, chromatography, including gas-liquid chromatography, thin-layer chromatography, and the like.

The starting compounds for the above reduction are the halo-keto compounds of formulas (I), (II) and (III) where one or more of $Z^6$, $Z^7$, $Z^{7'}$, $Z^{10}$, $Z^{11}$ or $Z^{11'}$ are halo, preferably chloro or bromo. However, the starting halo compounds are not substituted with halide atoms on two adjacent carbon atoms, that is, $Z^6$ and $Z^7$, or $Z^{10}$ and $Z^{11}$ are not both substituted with halo groups simultaneously.

Another process, a dehydrohalogenation, employed for the preparation of the present novel keto compounds of formulas (IV)-(VIII) can be illustrated by the following reaction sequence using partial structures:

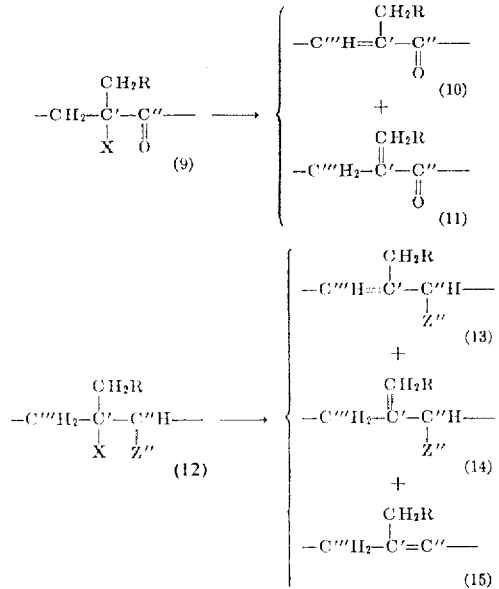

where R is $R^2$ or $R^3$;
X is halo, preferably chloro or bromo;

$Z''$ is hydrogen, hydroxy, a conventional hydrolyzable ether group or a conventional hydrolyzable ester group;
$C'''$, $C'$ and $C''$ are the C-8, C-7 and C-6 carbon atoms or the C-12, C-11 and C-10 carbon atoms respectively; and
$R^2$ and $R^3$ are as defined hereinbefore.

The configuration represented by partial structure (15) is only obtained, along with the configurations represented by partial structures (13) and (14), when group $Z''$ on the starting halo compound is hydrogen.

The starting halo-keto compounds for the above present process are described above.

The dehydrohalogenation is carried out by treating the corresponding starting halo-keto compounds of formulas (I)-(III) with a basic dehydrohalogenation reagent, such as, e.g., a tertiary amine such as triethyl amine, pyridine, quinoline, 1,5-diazabicyclo [4,3,0]non-5-ene, 1,5-diazabicyclo [4,4,0]dec-5-ene; an alkali metal lower alkoxide such as sodium methoxide, potassium methoxide, sodium ethoxide, potassium ethoxide, potassium t-butoxide; an alkali metal hydroxide such as sodium hydroxide, potassium hydroxide; an alkali metal carbonate such as sodium carbonate, potassium carbonate, lithium carbonate; an alkali halide such as lithium chloride, lithium bromide; and the like. Preferably a tertiary amine or an alkali metal carbonate is employed.

When the dehydrohalogenation is performed with a tertiary amine, the amine is often also employed as the sole solvent. Optionally, a non-aqueous inert organic co-solvent can be used. Typical co-solvents include hydrocarbons such as n-hexane, n-heptane, iso-octane, cyclohexane, benzene, toluene, xylene; lower alkanols such as methanol, ethanol, 2-propanol, t-butanol; ethers such as diethylether, dibutylether, tetrahydrofuran, dioxane, 2,2'-dimethoxydiethyleneglycol, 1,2-dimethoxyethane, 1,2-di(2'-methoxyethoxy) ethane; and the like.

When the dehydrohalogenation is carried out employing an alkali metal carbonate or an alkali metal halide as a reagent, an ether, such as the ones described above, or an N,N-dialkyl hydrocarbon carboxylic acid amide, such as dimethylformamide, dimethylacetamide, and the like, is employed as a solvent. Optionally, mixtures of such solvents can be employed. When the alkali metal hydride is employed in an ether solvent, at least a molar equivalent of an alkali metal carbonate is concomitantly employed to prevent the reaction media from becoming acidic.

When the dehydrohalogenation is carried out with an alkali metal lower alkanol as the basic reagent, a lower alkanol, such as the ones described above, or a hydrocarbon such as the ones described above, is employed as a solvent. Mixtures of such solvents are also employed.

At least a molar equivalent of the basic reagent, and preferably 5 or more molar equivalents of the basic reagent, are used for every molar equivalent of halogen present on the starting halo compounds. There is no limit as to the amount of excess basic reagent that can be employed, but economic considerations will generally dictate a practical upper limit.

The dehydrohalogenation reaction is carried out at temperatures in the range of from about -10° C. to about 150° C., conveniently at the reflux temperature of the reaction mixture. The dehydrohalogenation is performed under non-aqueous, preferably anhydrous, conditions. Optionally, the reaction is performed in an inert atmosphere, such as under a nitrogen gas atmosphere. The reaction period varies; it is dependent upon the reaction conditions, the reagents, the starting materials, and the like. Nevertheless, the reaction period usually is in the range of from about 30 minutes to about 100 hours.

Hydroxy groups alpha to the halo groups are protected prior to the above process by etherification or esterification, or the like. If the hydroxy group in the chlorohydrin or bromohydrin starting halo compound is not protected, an oxido group bridging the carbon atoms that contained the halo group and the hydroxy group is obtained as a product of the above dehydrohalogenation process. After the dehydrohalogenation, the ether or ester groups can be hydrolyzed by conventional methods to obtain the free hydroxy groups.

The novel compounds of the present invention are isolated from the reaction mixture by conventional techniques. For example, the reaction mixture is evaporated to one-third of its original volume and an equal volume of an inert organic solvent immiscible with water, such as methylene chloride, is added. The mixture is washed to neutrality and evaporated.

The reaction product contains usually one or more compounds. For example, as explained above, a compound unsaturated at the C–10,11 carbon atoms, a compound unsaturated at the C–11,11' carbon atoms and a compound unsaturated at the C–11,12 carbon atoms can be obtained by employing a halo starting compound containing a halo group at the C–11 position in the above dehydrohalogenating processes. These compounds are separated by techniques well-known to the art as, for example, distillation and chromatography, including gas-liquid chromatography, column chromatography and thin-layer chromatography.

The compounds are used both as individual compounds or as mixtures of two or more compounds. Thus the reaction product is often unseparated and utilized as a mixture in arthropoda population control. Accordingly, additional halo groups are introduced into the keto compounds following the latter two processes when required.

The halo groups are introduced by conventional techniques well-known to the art. The preferred process comprises treating novel oxido keto compounds of formulas (I)-(VIII) with an anhydrous mixture of a hydrogen halide in an aprotic solvent, such as dioxane, to yield the corresponding novel halohydrin keto compounds of formulas (I)-(VIII). The latter are etherified by treatment with a diazoalkane, such as diazoethane, in the presence of borontrifluoride, or the latter are esterified by conventional techniques, such as with a carboxylic acid anhydride in a carboxylic acid in the presence of p-toluenesulfonic acid.

In some instances, for convenience the various isomeric forms are specified; however, the carbon-carbon double bonds, epoxide, methylene, difluoromethylene or dichloromethylene groupings can be cis or trans geometric isomers, independent of each other and in fact isomeric mixtures are frequently employed in the described reactions.

The following examples will serve to further typify the nature of this invention. As these are presented solely for the purposes of illustration, they should not be construed as a limitation on the scope of this invention.

EXAMPLE 1

To a stirred solution of 1 g. of ethyl-3,7,11-trimethyl-6-hydroxy-7-chlorododeca-2,10-dienoate in 10 ml. of acetone, cooled to 0° C., is added under nitrogen a solution of 8N chromic acid (prepared by mixing 26 g. of chromium trioxide with 23 ml. of concentrated sulfuric acid and diluting with water to 100 ml.) until the color of the reagent persists in the mixture. The mixture is then stirred for 1 minute at 0–5° C. and diluted with water. The product is extracted with ether, washed with water and dried under vacuum to yield ethyl-3,7,11-trimethyl-6-oxo-7-chlorododeca-2,10-dienoate, which is further purified by silica chromatography.

By the method of the above process the following novel keto compounds are prepared from the corresponding 6 or 10 hydroxy compounds:

N,N-diethyl-3,11-dimethyl-7-ethyl-6-oxo-7-chloro-10,11-oxidotridec-2-enamide;
methyl-3,7,11-trimethyl-6-oxo-7-fluorotrideca-2,10-dienoate,
N,N-dimethyl-3,11-dimethyl-7-ethyl-6-oxo-7-fluorotrideca-2,10-dienamide,
1-ethoxy-3,7,11-trimethyl-6-oxo-7-chlorotrideca-2,10-diene, 1-tetrahydropyran-2'-yloxy-3,7,11-trimethyl-6-oxo-7-fluorododeca-2,10-diene,
3,7,11-trimethyl-10-oxo-11-chlorododeca-2,6-dienoyl-piperidine, methyl-3,7,11-trimethyl-10-oxo-11-fluorotrideca-2,6-dienoate, 3,11-dimethyl-7-ethyl-10-oxo-11-fluorotridec-2-enamide, 1-ethoxy-3,11-dimethyl-7-ethyl-10-oxo-11-chloro-6,7,-oxidotridec-2-ene, and
dimethyl-3,11-dimethyl-7-butyl-10-oxo-11-tetrahydropyran-2'-yloxydodeca-2,6-dienyl phosphonate.

EXAMPLE 2

A solution of 6 g. of ethyl-3,7,11-trimethyl-6-hydroxy-7-ethoxydodec-2-enoate in 20 ml. of pyridine is added to a mixture of 6 g. of chromic trioxide in 120 ml. of pyridine. The reaction mixture is allowed to stand at room temperature for 15 hours, diluted with ether and filtered through diatomaceous earth. The filtrate is washed well with water, dried and evaporated to dryness to yield ethyl-3,7,11-trimethyl-6-oxo-7-ethoxydodec-2-enoate, which may be further purified by fractional vacuum distillation.

Similarly, the following compounds are obtained by employing the corresponding 6- or 10-hydroxy, or 6,10-dihydroxy starting materials in the above process:

tetrahydrofuran-2'-yloxy-3,7,11-triethyl-7,11-diethoxy-10-oxotridec-2-en,
3,11-dimethyl-7-ethyl-6-oxo-7-chloro-11-acetoxytridec-2-enyloyl morpholine,
ethyl-3,7,11-trimethyl-6-oxo-7-chloro-11-acetoxydodec-2-enoate, 3,7,11-trimethyl-6-oxo-7-fluoro-11-ethoxytridec-2-enyloyl pyrrolidine,
ethyl-3,11-dimethyl-7-ethyl-6,10-dioxo-7,11-dichlorotridec-2-enoate,
hexyl-3,11-dimethyl-7-ethyl-6-oxo-7-chlorotridec-2-enoate, N,N-diethyl-3,11-dimethyl-7-ethyl-6-oxo-7-methoxytridec-2-enamide,
butyl-3,7,11-trimethyl-6-oxo-7-ethoxytridec-2-enoate, 1,7-diethoxy-3,11-dimethyl-7-ethyl-6-oxotridec-2-ene,
propyl-3,11-dimethyl-10-oxo-11-chloro-7-ethyltrideca-2,6-dienoate,
ethyl-3,7,11-trimethyl-6-oxo-7-chlorododeca-2,10-dienoate, and
3,7,11-trimethyl-10-oxo-11-fluorododec-2-enamine.

The hydroxy starting materials are prepared by the methods of the process disclosed in U.S. co-pending Pat. application Ser. Nos. 618,351 and 618,339, filed on February 24, 1967, each now abandoned.

EXAMPLE 3

A solution of 1.1 equivalents of chromium trioxide in 5 ml. of 80 percent acetic acid is added dropwise to a stirred solution of 1 g. of ethyl-3,7,11-trimethyl-7,11-dichloro-10-hydroxydodec-2-enoate in 10 ml. of glacial acetic acid, the temperature being maintained at about 20° C. during the addition. After 100 hours at reflux temperature, the mixture is poured into ice water and the product extracted with benzene, washed with water, dried and evaporated to yield ethyl-3,7,11-trimethyl-7,11-dichloro-10-oxododec-2-enoate, purified by fractional vacuum distillation.

Similarly, by the method of the above process, the following novel keto compounds are prepared from the corresponding 6- or 10-hydroxy or 6,10-dihydroxy compounds:

diethyl-3,7-diethyl-11-methyl-2,3-methylene-6,7-oxido-10-oxo-11-chlorotridecyl phosphonate,
N,N-dipropyl-3,11-dimethyl-7-ethyl-7,11-dichloro-10-oxotridec-2-enamide,
1-ethoxy-3,7,11-trimethyl-7,11-dichloro-10-oxotridec-2-ene, 3,7,11-trimethyl-7,11-difluoro-10-oxododec-2-enyloyl piperazine,
N,N-diethyl-3,7,11-trimethyl-10-oxo-11-ethoxydodec-2-enamide, 1,11-dimethoxy-3,7,11-trimethyl-10-oxotridec-2-enamide, pentyl-3,7,11-trimethyl-10-oxo-11-ethoxydodec-2-enamide, 1,11-dimethoxy-3,7,11-trimethyl-10-oxotridec-2-enamide, pentyl-3,7,11-trimethyl-10-oxo-11-ethoxytrideca-2,6-dienoate, diethyl-3,7-diethyl-11-methyl-2,3-methylene-6,7-oxido-10-oxo-11-chlorotridecyl phosphonate and 3,11-diethyl-7-isopropyl-6,10-dioxo-7,11-diethoxytridec-2-
enoyl morpholine.

EXAMPLE 4

To a mixture of 31 g. of ethyl-3,7,11-trimethyl-6-oxo-7-chlorododec-2-enoate (prepared according to the process of either Example 1, 2, or 3) and 300 ml. of acetic acid, 7 g. of zinc dust is slowly added with stirring while maintaining the reaction temperature below 30° C. After the completion of the addition of zinc, the mixture is stirred for an additional 2 hours. It is then filtered and evaporated to dryness in vacuo. The residue is taken up in methylene chloride, washed with water to neutrality, dried over sodium sulfate and evaporated to dryness under vacuum to yield ethyl-3,7,11-trimethyl-6-oxododec-2-enoate.

Similarly, by the method of the above process, the following novel keto compounds are prepared from the corresponding 7-bromo-6-oxo or 7-chloro-6-oxo halo keto compounds:

N,N-diethyl-3,7,11-trimethyl-6-oxotridec-2-enamide;
1-ethoxy-3,11-dimethyl-7-ethyl-6-oxotridec-2-ene;
methyl-3,11-dimethyl-7-ethyl-6-oxotrideca-2,10-dienoate;
1-butoxy-3,7,11-trimethyl-6-oxotrideca-2,10-diene;
ethyl-3,7,11-trimethyl-6-oxo-10,11-oxidotridec-2-enoate;
and
N,N-diethyl-3,11-dimethyl-7-ethyl-6-oxo-10,11-oxidotridec-2-enamide.

Similarly, by the method of the above process the following novel keto compounds are prepared from the corresponding 11-chloro-10-oxo or 11-bromo-10-oxo compounds:

ethyl-3,7,11-trimethyl-10-oxotridec-2-enoate;
N,N-dimethyl-3,11-dimethyl-7-ethyl-10-oxotridec-2-enamide;
3,7,11-trimethyl-10-oxododeca-2,6-dienyloyl pyrrolidine;
1-ethoxy-3,7,11-triethyl-6,7-oxido-10-oxotridec-2-ene; and
3,7,11-trimethyl-6,7-oxido-10-oxododec-2-enyloyl
morpholine.

Similarly, the other halo-keto compounds prepared by the methods of Examples 1 through 3 can be utilized as starting materials in the above process.

EXAMPLE 5

To a mixture of 15 g. of N,N-diethyl-3,7,11-trimethyl-10-oxo-11-chlorododeca-2,6-dienamide and 250 ml. of pyridine, 4 g. of zinc dust are slowly added with stirring while maintaining the reaction temperature below 30° C. After the completion of the addition, the reaction is stirred for an additional hour, then filtered and evaporated to dryness under reduced pressure to obtain N,N-diethyl-3,7,11-trimethyl-10-oxododeca-2,6-dienamide.

EXAMPLE 6

A mixture of 60 g. of 1-ethoxy-3,7,11-trimethyl-10-oxo-11-chlorotrideca-2,6-diene, 350 g. of neutral Raney nickel and 1 liter of ethanol (previously distilled over Raney nickel) is stirred at room temperature for 6 hours. The mixture is filtered and the filtrate is evaporated to dryness The residue is dissolved in chloroform, washed with a 1N sodium bicarbonate solution and washed with water to remove all inorganic ions. The chloroform solution is then dried over sodium sulfate and evaporated to dryness to yield 1-ethoxy-3,7,11-trimethyl-10-oxotrideca-2,6-diene.

Similarly, the novel halo-keto compounds prepared by the processes of Examples 1 through 3 are utilized as starting materials in the above process to obtain the corresponding keto compounds.

Similarly, the novel keto compounds of Paragraph II are prepared from the corresponding chloro- or bromo-keto compounds of Paragraph I by employing the latter as starting materials in the above process.

I.

1-methoxy-3,7,11-trimethyl-6-oxo-7-bromo-11-ethoxydodec-2-ene;

3,7,11-trimethyl-6-oxo-7-chloro-11-acetoxytridec-2-enyloyl piperidine;
propyl-3,11-dimethyl-7-ethyl-6-oxo-7-chloro-11-hydroxytridec-2-enoate;
N,N-dimethyl-3,7,11-trimethyl-6-oxo-7-bromododeca-2,10-dienamide;
ethyl-3,11-dimethyl-7-ethyl-7-chloro-10-oxo-11-ethoxytridec-2-enoate;

II.

1-methoxy-3,7,11-trimethyl-6-oxo-11-ethoxydodec-2-ene;
3,7,11-trimethyl-6-oxo-11-acetoxytridec-2-enyloyl
piperidine;
propyl-3,11-dimethyl-7-ethyl-6-oxo-11-hydroxytridec-2-enoate;
N,N-dimethyl-3,7,11-trimethyl-6-oxododeca-2,10-dienamide; and
ethyl-3,11-dimethyl-7-ethyl-10-oxo-11-ethoxytridec-2-enoate.

EXAMPLE 7

To a solution of 30 g. of N,N-dipropyl-3,7,11-trimethyl-10-oxo-11-chlorododeca-2,6-dienamide and 250 ml. of dry ethyl acetate, 500 mg. of (4 percent) activated palladium-on-barium sulfate are added. The resulting mixture is hydrogenated at room temperature until the starting material has been reduced. The mixture is filtered over a bed of diatomaceous earth, and the filtrate is evaporated to dryness under reduced pressure to predominately yield the desired N,N-dipropyl-3,7,11-trimethyl-10-oxododecanamide, which is purified by preparative scale gas-liquid chromatography.

Similarly, other starting halo-keto compounds are similarly reduced.

EXAMPLE 8

A solution of 2 g. of N,N-diethyl-3,11-dimethyl-7-ethyl-6-oxo-7-chlorotrideca-2,10-dienamide in 40 ml. of cold dimethylformamide is added over 15 minutes to a refluxing suspension of 5 g. of finely divided calcium carbonate in 15 ml. of dimethylformamide. The mixture is refluxed for 30 minutes, cooled and filtered. The filtrate is diluted with water and extracted with ethyl acetate and these extracts are washed with dilute hydrochloric acid, water, aqueous sodium bicarbonate solution and water, dried over sodium sulfate and evaporated to dryness. The residue is chromatographed on silica gel to yield a mixture of N,N-diethyl-3,11-dimethyl-7-ethyl-6-oxotrideca-2,7,10-trienamide and N,N-diethyl-3,11-dimethyl-7-ethylidene-6-oxotrideca-2,10-dienamide.

Similarly, the novel compounds of Paragraph II are prepared from the corresponding halo starting compounds of Paragraph I by employing the latter in the above process.

Paragraph I ethyl-3,7,11-trimethyl-6-oxo-7-fluorotrideca-2,10-
dienoate;
1-ethoxy-3,7,11-trimethyl-10-oxo-11-chlorododec-2-ene;
diethyl-3,7-dimethyl-11-ethyl-6,7-oxido-10-oxo-11-chlorotridec-2-enyloyl phosphonate; and
1-hydroxy-7,11-dimethyl-3-ethyl-6-oxo-7,11-dichlorotetradec-2-ene.

Paragraph II ethyl-3,7,11-trimethyl-6-oxotrideca-2,7,10-trienoate;
ethyl-3,11-dimethyl-6-oxo-7,-methylenetrideca-2,10-
dienoate;
1-ethoxy-3,7-dimethyl-11,11-methylene-10-oxododec-2-ene;
diethyl-3,7-dimethyl-11-ethylidene-6,7-oxido-10-oxotridec-2-enyloyl phosphonate;
1-hydroxy-7,11-dimethyl-3-ethyl-6-oxotetradeca-2,7,11-triene;
3-ethyl-11-methyl-7,7-methylene-6-oxotetradeca-2,11-dien-1-ol;
3-ethyl-7-methyl-11,11-methylene-6-oxotetradeca-2,7-dien-1-ol;

3-ethyl-7-methyl-11,11-methylene-6-oxotetradeca-2,6-
dien-1-ol;
3-ethyl-7,7;11,11-bismethylene-6-oxotetradec-2-en-1-ol;
3-ethyl-7,11-dimethyl-6-oxotetradeca-2,7,10-trien-1-ol;
and
3-ethyl-7,11-dimethyl-6-oxotetradeca-2,6,11-trien-1-01.

EXAMPLE 9

Twenty-five grams of 1,5-diazabicyclo [4,3,0]non-5-ene is added to a mixture of 30 g. of ethyl-3,7,11-trimethyl-10-oxo-11-chlorotrideca-2,6-dienoate and 500 ml. of anhydrous benzene. The addition is performed at 30° C. After 1 hour, the reaction mixture is heated to reflux temperature and then allowed to reflux for an additional 90 minutes. Five hundred milliliters of diethyl ether is then added; the mixture is washed with three 200 ml. portions of 2N sulfuric acid and then with water to neutrality. The mixture is dried over sodium sulfate and evaporated under reduced pressure to yield a mixture of ethyl-3,7,11-trimethyl-10-oxotrideca-2,6,11-trienoate, and ethyl-3,7-dimethyl-11,11-methylene-10-oxotrideca-2,6-dienoate.

Similarly, other novel starting halo-keto compounds prepared by the processes of Examples 1 through 3 can be utilized as starting materials in the present process. For example, 3,11-dimethyl-7-propyl-2,3-methylene-10-oxo-11-ethoxy dodec-7-enyloyl pyrrolidine and 3,11-dimethyl-7-proplidiene-2,3-oxido-10-oxo-11-ethoxydodecanyloyl pyrrolidine, and ethyl-3, 11-dimethyl-7-ethyl-6-oxo-10,11-oxidotrideca-2,7-dienoate and ethyl-3,11-dimethyl-7-ethylidene-6-oxo-10,11-oxidotridec-2-enoate are prepared from 3,11-dimethyl-7-propyl-2,3-methylene-7-bromo-10-oxo-11-ethoxydodecanyloyl pyrrolidine and ethyl-3,11-dimethyl-7-ethyl-6-oxo-7-chloro-10,11-oxidotridec-2-enoate, respectively, by employing the latter as starting materials in the above process.

The novel starting halo-keto compounds are prepared by the processes of Example 1 through 3.

EXAMPLE 10

To a mixture of 100 g. of lithium bromide, 10 g. of lithium carbonate and 500 ml. of dimethyl acetamide is added 25 g. of ethyl-3,11-dimethyl-7-ethyl-10-oxo-11-chlorododeca-2,6-dienoate; the mixture is refluxed for 2 hours. The mixture is cooled, filtered and 500 ml. of methylene chloride is added; the mixture is washed with water to neutrality, dried over sodium sulfate and evaporated under reduced pressure to yield ethyl-3-methyl-7-ethyl-11,11-methylene-10-oxododeca-2,6-dienoate.

The novel halo-keto compounds obtained by the processes of Examples 1 through 3 are utilized as starting materials in the above process. Accordingly, ethyl-3,11-dimethyl-7-ethylidene-6-oxo-10,11-methylenetridec-2-enoate is obtained from the corresponding 7-chloro- or 6-bromo-keto compounds.

EXAMPLE 11

A mixture of 50 g. of 1,7,11-triethoxy-3,7-dibutyl-11-methyl-6-fluoro-10-oxotetradec-2-ene and 500 ml. of triethylamine are refluxed for 1 hour; then the mixture is cooled and 500 ml. of diethylether are added. The mixture is washed with water to neutrality, dried over sodium sulfate and evaporated under reduced pressure to yield 1,7,11-triethoxy-3,7-dipropyl-11-methyl-10-oxotetradeca-2,5-diene. The compound is purified by distillation and gas-liquid chromatography.

The novel halo-keto compounds obtained from the processes of Examples 1 through 3 can be utilized as starting materials in the above processes.

EXAMPLE 12

A solution of ethyl-3,7,11-trimethyl-6,7-oxido-10-oxotridec-2-enoate (30 g.) and 300 ml. of anhydrous dioxane is treated with a slow stream of hydrogen chloride. The reaction is performed at 30° C. and the reaction mixture is allowed to stand for 5 hours. Three hundred milliliters of benzene are added, and the resulting mixture is washed with water to neutrality, dried over sodium sulfate, and evaporated to dryness under vacuum to yield ethyl-3,7,11-trimethyl-6-hydroxy-7-chloro-10-oxotridec-2-enoate and ethyl-3,7,11-trimethyl-6-chloro-7-hydroxy-10-oxotridec-2-enoate. Ethyl-3,7,11-trimethyl-6-hydroxy-3,7-dichloro-10-oxotridecenoate and ethyl-3,7,11-trimethyl-3,6-dichloro-7-hydroxy-10-oxotridecanoate are obtained in lesser amounts. The compounds are separated by gas-liquid chromatography and identified by their mass spectrum and nuclear magnetic resonance spectrum.

By utilizing anhydrous hydrogen fluoride/dioxane in place of hydrogen chloride/dioxane, ethyl-3,7,11-trimethyl-6-hydroxy-7-fluoro-10-oxotridec-2-enoate and ethyl-3,7,11-trimethyl-6-fluoro-7-hydroxy-10-oxotridec-2-enoate are obtained. By utilizing anhydrous hydrogen bromide in place of hydrogen chloride, the corresponding bromo compounds are obtained.

2-Hydroxy-3-halo- and 2-halo-3-hydroxy-; 10-hydroxy-11-halo- and 10-halo-11-hydroxy-; 2,6-dihydroxy-3,7-dihalo-and 2,7-dihydroxy-3,6 -dihalo- and 3,6-dihydroxy-2,7-dihalo-and 3,7-dihydroxy-2,6-dihalo-; and 2,10-dihydroxy-3,11-dihalo-and 2,11-dihydroxy-3,10-dihalo- and 3,10-dihydroxy-2,11-dihalo-and 3,11-dihydroxy-2,10-dihalo-keto compounds are obtained from the corresponding 2,3-oxido-, 10,11-oxido-, 2,3;6,7-bisoxido- and 2,3;10,11-bisoxido-keto compounds when the latter are used as starting compounds in the above process.

EXAMPLE 13

To a mixture of N,N-diethyl-3,7,11-trimethyl-6-oxo-10-hydroxy-11-fluorotridec-2-enamide (prepared according to the process of Examples 1, 9 and 12 from N,N-diethyl-3,7,11-trimethyl-6-hydroxy-7-chloro-10,11-oxidotridec-2-enamide) [10 g.] and anhydrous diethyl ether is added one molar equivalent of diazo ethane; there is then added one drop of boron trifluoride. The mixture is allowed to stand for 1 hour at 0° C. and then for an additional hour at 30° C. The mixture is evaporated to dryness to yield N,N-diethyl-3,7,11-trimethyl-6-oxo-10-ethoxy-11-fluorotridec-2-enamide.

By employing other diazo alkanes in the above process, the corresponding alkoxy compound is prepared. Accordingly, N,N-diethyl-3,7,11-trimethyl-6-oxo-10-methoxy-11-fluorotridec-2-enamide is prepared by employing diazo methane in place of diazo ethane in the above example.

The above process is the preferred etherification procedure for novel halohydrin-keto compounds prepared by the process of Example 12.

EXAMPLE 14

Ten grams of diethyl-3,7,11-trimethyl-6-oxo-10,11-oxidotridec-2-enyl phosphonate (prepared from diethyl-3,7,11-trimethyl-6-hydroxy-7-chloro-10,11-oxidotridec-2-enyl phosphonate by the processes of Examples 1 and 6) are added to 100 ml. of a 0.01N aqueous perchloric acid solution and the resultant solution is allowed to stand at room temperature for 24 hours. Thereafter the mixture is washed with an aqueous sodium bicarbonate solution, dried over sodium sulfate, and evaporated, giving diethyl-3,7,11-trimethyl-6-oxo-10,11-dihydroxytridec-2-enyl phosphonate.

Similarly, N,N-diethyl-3,7,11-trimethyl-6-oxo-7-chloro-10,11-dihydroxydodec-2-enamide;
 N,N-dimethyl-3,11-dimethyl-7-ethyl-6-oxo-7-ethoxy-10,11-di-hydroxytridec-2-enamide;
 ethyl-3,11-dimethyl-7-ethyl-6-oxo-10,11-dihydroxytridec-2-enoate;
 dimethyl-3,7,11-trimethyl-6-oxo-7-chloro-10,11-dihydroxydodec-2-enyl phosphate; and
 propyl-3,7,11-trimethyl-6-oxo-7-ethoxy-10,11-dihydroxytridec-2-enoate are prepared from the corresponding 10,11-oxido compounds; and 3,7,11-triethyl-6,7- dihydroxytrideca-3,11-dienoic acid;
capryl-3-methyl-7-ethyl-11-propyl-6,7-dihydroxy-10-oxopenta-decanoate;
N,N-diethyl-3,7-dimethyl-11-ethyl-6,7-dihydroxy-10-oxo-11-chlorotridec-2-enamide; and
1-ethoxy-3,7,11-trimethyl-6,7-dihydroxydodeca-2,11-diene are prepared from the corresponding 6,7-oxido compounds.

EXAMPLE 15

One gram of 3,11-dimethyl-7-ethyl-6-oxo-10,11-oxidotridec-2-enyloyl pyrrolidine is added to 75 ml. of non-aqueous 0.01N perchloric acid in ethanol. The mixture is allowed to stand for 24 hours at 25° C. The mixture is neutralized with aqueous sodium bicarbonate and extracted with methylene chloride. The extract is washed with water dried over sodium sulfate, and evaporated to yield 3,11-dimethyl-7-ethyl-6-oxo-10-hydroxy-11-ethoxytridec-2-enyloyl pyrrolidine.

Utilizing other alkanols in place of ethanol, the corresponding 6-hydroxy-7-alkoxy or 10-hydroxy-11-alkoxy compounds are prepared from the corresponding 6,7-oxido or 10,11-oxido compounds. Accordingly, diethyl-3,7-dimethyl-11,11-methylene-6-hydroxy-7-methoxydodec-2-enyl phosphonate is prepared from diethyl-3,7-dimethyl-11,11-methylene-6,7-oxidododec-2-enyl phosphonate be treating the latter with 0.01N perchloric acid/methanol.

EXAMPLE 16

A mixture of 25 g. of N,N-diethyl-3,11-dimethyl-7-ethyl-6,7-methylene-10-oxo-11-chlorododec-2-enamide, 250 ml. of triethylamine, 250 ml. of pyridine and 500 ml. of xylene are refluxed for 100 hours; then the mixture is cooled and 500 ml. of diethylether are added. The mixture is washed with water to neutrality, dried over sodium sulfate and evaporated under reduced pressure to yield N,N-diethyl-3,11-dimethyl-7-ethyl-6,7-methylene-10-oxododec-2,11-dienamide. The compounds are purified by distillation and gas-liquid chromatography.

The novel halo-keto compounds obtained from the processes of Examples 1 through 3 can be utilized as starting materials in the above processes.

EXAMPLE 17

Part A

Into a mixture of 2 g. of methyl 10,11-oxido-3,7,11-trimethyltrideca-2,6-dienoate in 150 ml. of ether, there is introduced a slow stream of hydrogen chloride for 1 hour at 0° C. The mixture is then allowed to stand at 0° C. for 18 hours. Then the mixture is washed with 5 percent aqueous sodium bicarbonate solution, dried over sodium sulfate and evaporated to an oil containing methyl 11-chloro-10-hydroxy-3,7,11-trimethyltrideca-2,6-dienoate and methyl 7,11-dichloro-10-hydroxy-3,7,11-trimethyltridec-2-enoate which are separated and purified by preparative silica chromatography. The reaction also yields methyl 10-chloro-11-hydroxy-3,7,11-trimethyltrideca-2,6-dienoate and methyl 7,10-dichloro-11-hydroxy-3,7,11-trimethyltridec-2-enoate which can be separated from the reaction product mixture by chromatography.

By repeating the foregoing process using as the starting material each of methyl 10,11-oxido-3,7,11-trimethyldodeca-2,6-dienoate, methyl 10,11-oxido-3,11-dimethyl-7-ethyltrideca-2,6-dienoate, ethyl 10,11-oxido-3,11-dimethyl-7-ethyltrideca-2,6-dienoate, ethyl 10,11-oxido-3,7,11-trimethyltrideca-2,6-dienoate and ethyl 10,11-oxido-3,7,11-trimethyldodeca-2,6-dienoate, there is obtained methyl 11-chloro-10-hydroxy-3,7,11-trimethyldodeca-2,6-dienoate, methyl 11-chloro-10-hydroxy-3,11-dimethyl-7-ethyltrideca-2,6-dienoate, ethyl 11-chloro-10-hydroxy-3,11-dimethyl-7-ethyltrideca-2,6-dienoate, ethyl 11-chloro-10-hydroxy-3,7,11-trimethyltrideca-2,6-dienoate and ethyl 11-chloro-10-hydroxy-3,7,11-trimethyldodeca-2,6-dienoate and the corresponding 7,11-dichloro-10-hydroxy-, 10-chloro-11-hydroxy- and 7,10-dichloro-11-hydroxy- derivatives.

By repeating the above process using hydrogen bromide in place of hydrogen chloride, the corresponding 11-bromo-10-hydroxy-, 7,11-dibromo-10-hydroxy-, 10-bromo-11-hydroxy- and 7,10-dibromo-11-hydroxy- derivatives are obtained. Similarly, the use of hydrogen fluoride yields the corresponding fluoro derivatives.

Part B

By use of the procedure of Example 1, each of the 11-halo-10-hydroxy- and 7,11-dihalo-10-hydroxy- compounds of Part A of this example is oxidized to the corresponding 10-oxo compound. Thus, methyl 11-chloro-10-oxo-3,7,11-trimethyltrideca-2,6-dienoate and methyl 7,11-dichloro-10-oxo-3,7,11-trimethyltridec-2-enoate, methyl 11-chloro-10-oxo-3,7,11-trimethyldodeca-2,6-dienoate and methyl 7,11-dichloro-10-oxo-3,7,11-trimethyldodec-2-enoate, methyl 11-chloro-10-oxo-3,11-dimethyl-7-ethyltrideca-2,6-dienoate and methyl 7,11-dichloro-10-oxo-3,11-dimethyl-7-ethyltrideca-2,6-dienoate, ethyl 11-chloro-10-oxo-3,11-dimethyl-7-ethyltrideca-2,6-dienoate and ethyl 7,11-dichloro-10-oxo-3,11-dimethyl-7-ethyltrideca-2,6-dienoate, ethyl 11-chloro-10-oxo-3,7,11-trimethyltrideca-2,6-dienoate and ethyl 7,11-dichloro-10-oxo-3,7,11-trimethyltridec-2-enoate and ethyl 11-chloro-10-oxo-3,7,11-trimethyldodeca-2,6-dienoate and ethyl 7,11-dichloro-10-oxo-3,7,11-trimethyldodec-2-enoate are obtained from the corresponding 11-chloro-10-hydroxy- and 7,11-dichloro-10-hydroxy- compounds.

Alternatively, the 10-keto compounds are obtained using the procedure of either Example 2 or 3.

EXAMPLE 18

The process of Example 9 is repeated using as the starting material each of the 11-chloro-10-oxo compounds of Example 17 (Part B) to yield:

methyl 10-oxo-3,7,11-trimethyltrideca-2,6,11-trienoate and methyl 10-oxo-3,7-dimethyl-11,11-methylenetrideca-2,6-dienoate;

methyl 10-oxo-3,7,11-trimethyldodeca-2,6,11-trienoate;

methyl 10-oxo-3,11-dimethyl-7-ethyltrideca-2,6,11-trienoate and methyl 10-oxo-11,11-methylene-3-methyl-7-ethyltrideca-2,6-dienoate;

ethyl 10-oxo-3,11-dimethy'-7-ethyltrideca-2,6,11-trienoate and ethyl 10-oxo-11,11-methylene-3-methyl-7-ethyltrideca-2,6-dienoate;

ethyl 10-oxo-3,7,11-trimethyltrideca-2,6,11-trienoate and ethyl 10-oxo-11,11-methylene-3,7-dimethyltrideca-2,6-dienoate; and ethyl 10-oxo-3,7,11-trimethyldodeca-2,6,11-trienoate.

EXAMPLE 19

The process of Example 1 is repeated using each of ethyl 6-hydroxy-3,11-dimethyl-7-ethyltrideca-2,10-dienoate, ethyl 10-hydroxy-3,11-dimethyl-7-ethyltrideca-2,6-dienoate and ethyl 6,10-dihydroxy-3,11-dimethyl-7-ethyltridec-2-enoate as the starting material to yield ethyl 6-oxo-3,11-dimethyl-7-ethyltrideca-2,10-dienoate, ethyl 10-oxo-3,11-dimethyl-7-ethyltrideca-2,6-dienoate and ethyl 6,10-di(oxo)-3,11-dimethyl-7-ethyltridec-2-enoate. The above 6-hydroxy-, 10-hydroxy- and 6,10-dihydroxy- starting materials and other starting materials for the oxo compounds of this invention can be prepared according to the procedure of Ser. No. 800,266, filed Feb. 18, 1969, now abandoned and Ser. No. 843,818, filed July 22, 1969, the disclosures of which are incorporated by reference.

EXAMPLE 20

Part A

Each of:
methyl 10,11-oxido-3,11-dimethyl-7-ethyltridec-2-enoate,
methyl 10,11-oxido-3,7,11-trimethyltridec-2-enoate,
methyl 6,7-oxido-3,7,11-trimethyltrideca-2,10-dienoate,
ethyl 10,11-oxido-3,11-dimethyl-7-ethyltridec-2-enoate, ethyl 2,3-methyl-10,11-oxido-3,7,11-trimethyltridec-6-enoate,
ethyl 2,3-methylene-10,11-oxido-3,11-dimethyl-7-ethyltridec-6-enoate,
ethyl 2,3-methylene-6,7-oxido-3,11-dimethyl-7-ethytridec-10-enoate,
ethyl 10,11-methylene-6,7-oxido-3,11-dimethyl-7-oxido-3,11-dimethyl-7-ethyltridec-2-enoate,
ethyl 6,7-methylene-10,11-oxido-3,11-dimethyl-7-ethyltridec-2-enoate,
ethyl 2,3;6,7-bismethylene-10,11-oxido-3,11-dimethyl-7-ethyltridecanoate,
ethyl 2,3-methylene-10,11-oxido-3,7,11-trimethyldodec-6-enoate is used as the starting material in the process of Example 17 (Part A) to yield:
methyl 11-chloro-10-hydroxy-3,11-dimethyl-7-ethyltridec-2-enoate,
methyl 11-chloro-10-hydroxy-3,7,11-trimethyltridec-2-enoate,
methyl 7,11-dichloro-6-hydroxy-3,7,11-trimethyltridec-2-enoate and
methyl 7-chloro-6-hydroxy-3,7,11-trimethyltrideca-2,10-dienoate,
ethyl 11-chloro-10-hydroxy-3,11-dimethyl-7-ethyltridec-2-enoate,
ethyl 2,3-methylene-11-chloro-10-hydroxy-3,7,11-trimethyltridec-6-enoate and
ethyl 2,3-methylene-7,11-dichloro-10-hydroxy-3,7,11-trimethyltridecanoate,
ethyl 2,3-methylene-11-chloro-10-hydroxy-3,11-dimethyl-7-ethyltridec-6-enoate and
ethyl 2,3-methylene-7,11-dichloro-10-hydroxy-3,11-dimethyl-7-ethyltridecanoate,
ethyl 2,3-methylene-7-chloro-6-hydroxy-3,11-dimethyl-7-ethyltridec-10-enoate and
ethyl 2,3-methylene-7,11-dichloro-6-hydroxy-3,11-dimethyl-7-ethyltridecanoate,
ethyl 10,11-methylene-7-chloro-6-hydroxy-3,11-dimethyl-7-ethyltridec-2-enoate,
ethyl 6,7-methylene-11-chloro-10-hydroxy-3,11-dimethyl-7-ethyltridec-2-enoate,
ethyl 2,3;6,7-bismethylene-11-chloro-10-hydroxy-3,11-dimethyl-7-ethyltridecanoate, and
ethyl 3,7,11-trimethyl-6,10-dihydroxy-7,11-dichlorododec-2-enoate,
ethyl 10,11-methylene-6-hydroxy-7-chloro-3,7,11-trimethyldodec-2-enoate,
methyl 11-bromo-10-hydroxy-3,7,11-trimethyltrideca-2,6-dienoate,
methyl 7,11-dibromo-10-hydroxy-3,7,11-trimethyltridec-2-enoate, is oxidized using the process of Example 1 to yield:
ethyl 6,10-di(oxo)-7,11-dichloro-3,7,11-trimethyldodec-2-enoate,
ethyl 10,11-methylene-6-oxo-7-chloro-3,7,11-trimethyldodec-2-enoate,
methyl 11-bromo-10-oxo-3,7,11-trimethyltrideca-2,6-dienoate and
methyl 7,11-dibromo-10-oxo-3,7,11-trimethyltridec-2-enoate.

Part D
Each of:
methyl 11-chloro-10-oxo-3,11-dimethyl-7-ethyltridec-2-enoate,
methyl 11-chloro-10-oxo-3,7,11-trimethyltridec-2-enoate,
methyl 7,11-dichloro-6-oxo-3,7,11-trimethyltridec-2-enoate,
methyl 7-chloro-6-oxo-3,7,11-trimethyltrideca-2,10-dienoate,
ethyl 11-chloro-10-oxo-3,11-dimethyl-7-ethyltridec-2-enoate,
ethyl 2,3-methylene-11-chloro-10-oxo-3,7,11-trimethyltridec-6-enoate,
ethyl 2,3-methylene-11-chloro-10-oxo-3,11-dimethyl-7-ethyltridec-6-enoate,
ethyl 2,3-methylene-7-chloro-6-oxo-3,11-dimethyl-7-ethyltridec-10-enoate,
ethyl 10,11-methylene-7-chloro-6-oxo-3,11-dimethyl-7-ethyltridec-2-enoate,
ethyl 2,3;6,7-bismethylene-11-chloro-10-oxo-3,11-dimethyl-7-ethyltridecanoate and
ethyl 2,3-methylene-11-chloro-10-oxo-3,7,11-trimethyldodec-6-enoate
is used as the starting material in the process of Example 9 to yield:
methyl 10-oxo-3,11-dimethyl-7-ethyltrideca-2,11-dienoate and
methyl 10-oxo-11,11-methylene-3-methyl-7-ethyltridec-2-enoate;
methyl 10-oxo-3,7,11-trimethyltrideca-2,11-dienoate and
methyl 10-oxo-11,11-methylene-3,7-dimethyltridec-2-enoate;
methyl 6-oxo-3,7,11-trimethyltrideca-2,7,11-trienoate,
methyl 6-oxo-7,7-methylene-3,11-dimethyltrideca-2,11-dienoate,
methyl 6-oxo-11,11-methylene-3,7-dimethyltrideca-2,7-dienoate,
methyl 6-oxo-7,7;11,11-bismethylene-3-methyltridec-2-enoate,
methyl 6-oxo-3,7,11-trimethyltrideca-2,7,10-trienoate and
methyl 6-oxo-7,7-methylene-3,11-dimethyltrideca-2,10-dienoate;
methyl 6-oxo-3,7,11-trimethyltrideca-2,7,10-trienoate and
methyl 7,7-methylene-6-oxo-3,11-dimethyltrideca-2,10-dienoate;
ethyl 10-oxo-3,11-dimethyl-7-ethyltrideca-2,11-dienoate and
ethyl 10-oxo-11,11-methylene-3-methyl-7-ethyltridec-2-enoate;
ethyl 2,3-methylene-10-oxo-3,7,11-trimethyltrideca-6,11-dienoate and
ethyl 2,3;11,11-bismethylene-10-oxo-3,7-dimethyltridec-6-enoate;
ethyl 2,3-methylene-10-oxo-3,11-dimethyl-7-ethyltrideca-6,11-dienoate and
ethyl 2,3;11,11-bismethylene-10-oxo-3-methyl-7-ethyltridec-6-enoate;
ethyl 2,3-methylene-6-oxo-3,11-dimethyl-7-ethyltrideca-7,10-dienoate and
ethyl 2,3-methylene-6-oxo-3,11-dimethyl-7,7-ethylidenetridec-10-enoate;
ethyl 10,11-methylene-6-oxo-3,11-dimethyl-7-ethyltrideca-2,7-dienoate and
ethyl 10,11-methylene-6-oxo-7,7-ethylidene-3,11-dimethyltridec-2-enoate;
ethyl 2,3;6,7-bismethylene-10-oxo-3,11-dimethyl-7-ethyltridec-11-enoate and
ethyl 2,3;6,7;11,11-trismethylene-10-oxo-3-methyl-7-ethyltri-decanoate; and
ethyl 2,3-methylene-10-oxo-3,7,11-trimethyldodeca-6,11-dienoate.

EXAMPLE 21

To a mixture of 2 g. of methyl 11-chloro-10-hydroxy-3,11-dimethyl-7-ethyltrideca-2,6-dienoate in 100 ml. of methylene chloride at 0° C., there is slowly added one molar equivalent of m-chloroperbenzoic acid in 100 ml. of methylene chloride. The resulting mixture is then allowed to stand for 15 minutes at 0° C. and then is washed, dried over sodium sulfate and evaporated to yield methyl 11-chloro-10-hydroxy-6,7-oxido-3,11-diemthyl-7-ethyltridec-2-enoate which treated with HCl using the procedure of Example 17 (Part A) affords methyl 7,11-dichloro-6,10-dihydroxy-3,11-dimethyl-7-ethyltridec-2-enoate which is oxidized using the procedure of Example 1 to yield methyl 7,11-dichloro-6,10-di(oxo)-3,11-dimethyl-7-ethyltridec-2-enoate which using the procedure of Example 9 yields methyl 6,10-di(oxo)-3,11-dimethyl-7-ethyltrideca-2,7,11-trienoate, methyl 6,10-di(oxo)-3-methyl-7,7-ethylidene-11,11-methylenetridec-2-enoate, methyl 6,10-di(oxo)-11,11-methylene-3-methyl-7-ethyltrideca-2,7-dienoate and methyl 6,10-di(oxo)-7,7-ethylidene-3,11-dimethyltrideca-2,11-dienoate which are separated by chromatography.

EXAMPLE 22

Into a mixture of 2 g. of N,N-diethyl 10,11-oxido-3,7,11-trimethyltrideca-2,6-dienamide in 150 ml. of ether, there is introduced a slow stream of hydrogen chloride for 1 hour at 0° C. The mixture is then allowed to stand at 0° C. for 18 hours. Then the mixture is washed with a 5 percent aqueous sodium bicarbonate solution, dried over sodium sulfate and evaporated to an oil containing a mixture of N,N-diethyl 11-chloro-10-hydroxy-3,7,11-trimethyltrideca-2,6-dienamide and N,N-diethyl 7,11-dichloro-10-hydroxy-3,7,11-trimethyltridec-2-enoate which are separated and purified by silica chromatography.

Using the above procedure, each of:
N,N-dimethyl 10,11-oxido-3,11-dimethyl-7-ethyltrideca-2,6-dienamide,
N,N-diethyl 10,11-oxido-3,11-dimethyl-7-ethyltrideca-2,6-dienamide,
N,N-dimethyl 10,11-oxido-3,7,11-trimethyltrideca-2,6-dienamide,
N,N-diethyl 10,11-oxido-3,7,11-trimethyldodeca-2,6-dienamide and
N,N-dimethyl 10,11-oxido-3,7,11-trimethyldodeca-2,6-dienamide are converted into
N,N-dimethyl 11-chloro-10-hydroxy-3,11-dimethyl-7-ethyltrideca-2,6-dienamide,
N,N-diethyl 11-chloro-10-hydroxy-3,11-dimethyl-7-ethyltrideca-2,6-dienamide,
N,N-dimethyl 11-chloro-10-hydroxy-3,7,11-trimethyltrideca-2,6-dienamide,
N,N-diethyl 11-chloro-10-hydroxy-3,7,11-trimethyldodeca-2,6-dienamide and
N,N-dimethyl 11-chloro-10-hydroxy-3,7,11-trimethyldodeca-2,6-dienamide.

The process of Example 1 is repeated using the above 11-chloro-10-hydroxy compounds to yield:
N,N-diethyl 11-chloro-10-oxo-3,7,11-trimethyltrideca-2,6-dienamide,
N,N-dimethyl 11-chloro-10-oxo-3,11-dimethyl-7-ethyltrideca-2,6-dienamide,
N,N-diethyl 11-chloro-10-oxo-3,11-dimethyl-7-ethyltrideca-2,6-dienamide,
N,N-dimethyl 11-chloro-10-oxo-3,7,11-trimethyltrideca-2,6-dienamide,
N,N-diethyl 11-chloro-10-oxo-3,7,11-trimethyldodeca-2,6-dienamide and
N,N-dimethyl 11-chloro-10-oxo-3,7,11-trimethyldodeca-2,6-dienamide.

By use of the procedure of Example 9, each of the 11-chloro-10-oxo compounds are converted into N,N-diethyl 10-oxo-3,7,11-trimethyltrideca-2,6,11-trienamide and N,N-diethyl 10-oxo-11,11-methylene-3,7-dimethyltrideca-2,6-dienamide; N,N-dimethyl 10-oxo-3,11-dimethyl-7-ethyltrideca-2,6,11-trienamide and N,N-dimethyl 10-oxo-11,11-methylene-3-methyl-7-ethyltrideca-2,6-dienamide; N,N-diethyl 10-oxo-3,11-dimethyl-7-ethyltrideca-2,6,11-trienamide and N,N-diethyl 10-oxo-11,11-methylene-3-methyl-7-ethyltrideca-2,6-dienamide; N,N-dimethyl 10-oxo-3,7,11-trimethyltrideca-2,6,11-trienamide and N,N-diemethyl 10-oxo-11,11-methylene-3,7-dimethyltrideca-2,6-dienamide; N,N-diethyl 10-oxo-3,7,11-trimethyldodeca-2,6,11-trienamide; and N,N-dimethyl 10-oxo-3,7,11-trimethyldodeca-2,6,11-trienamide, respectively.

EXAMPLE 23

EXAMPLE 23 a slow Into a mixture of 2 g. of 1-ethoxy-10,11-oxido-3,7,11-trimethyltrideca-2,6-diene in 150 ml. of ether, there is introduced a slow stream of hydrogen chloride for 1 hour at 0° C. The mixture is then allowed to stand at 0° C. for 18 hours. Then the mixture is washed with dilute aqueous sodium bicarbonate and water, dried over sodium sulfate and evaporated to yield 1-ethoxy-11-chloro-10-hydroxy-3,7,11-trimethyltrideca-2,6-diene which is purified by chromatography.

The above procedure is used to prepare 1-ethoxy-11-chloro-10-hydroxy-3,11-dimethyl-7-ethyltrideca-2,6-diene, 1-ethoxy-11-chloro-10-hydroxy-3,7,11-trimethyldodeca-2,6-diene; 1-acetoxy-11-chloro-10-hydroxy-3,11-dimethyl-7-ethyltrideca-2,6-diene, 1-acetoxy-11-chloro-10-hydroxy-3,7,11-trimethyltrideca-2,6-diene and 1-acetoxy-11-chloro-10-hydroxy-3,7,11-trimethyldodeca-2,6-diene from 1-ethoxy-10,11-oxido-3,11-dimethyl-7-ethyltrideca-2,6-diene, 1-ethoxy-10,11-oxido-3,7,11-trimethyl-dodeca-2,6-diene, 1-acetoxy-10,11-oxido-3,11-dimethyl-7-ethyl-trideca-2,6-diene, 1-acetoxy-10,11-oxido-3,7,11-trimethyltrideca-2,6-diene and 1-acetoxy-10,11-oxido-3,7,11-trimethyldodeca-2,6-diene.

By use of the process of Example 2, each of the above 11-chloro-10-hydroxy- compounds is oxidized to yield:
1-ethoxy-11-chloro-10-oxo-3,7,11-trimethyltrideca-2,6-diene,
1-ethoxy-11-chloro-10-oxo-3,11-dimethyl-7-ethyltrideca-2,6-diene,
1-ethoxy-11-chloro-10-oxo-3,7,11-triemthyldodeca-2,6-diene,
1-acetoxy-11-chloro-10-oxo-3,11-dimethyl-7-ethyltrideca-2,6-diene,
1-acetoxy-11-chloro-10-oxo-3,7,11-trimethyltrideca-2,6-diene and
1-acetoxy-11-chloro-10-oxo-3,7,11-trimethyldodeca-2,6-diene.

Each of the above 11-chloro-10-oxo compounds is used as the starting material in the process of Example 9 to yield:
1-ethoxy-10-oxo-3,7,11-trimethyltrideca-2,6,11-triene and
1-ethoxy-10-oxo-11,11-methylene-3,7-dimethyltrideca-2,6-diene;
1-ethoxy-10-oxo-3,11-dimethyl-7-ethyltrideca-2,6,11-triene and
1-ethoxy-10-oxo-11,11-methylene-3-methyl-7-ethyltrideca-2,6-diene;
1-ethoxy-10-oxo-3,7,11-trimethyldodeca-2,6,11-triene;
1-acetoxy-10-oxo-3,11-dimethyl-7-ethyltrideca-2,6,11-triene and
1-acetoxy-10-oxo-11,11-mehylene-3-methyl-7-ethyl-trideca-2,6-diene;
1-acetoxy-10-oxo-3,7,11-trimethyltrideca-2,6,11-triene and
1-acetoxy-10-oxo-11,11-methylene-3,7-dimethyltrideca-2,6-diene; and
1-acetoxy-10-oxo-3,7,11-trimethyldodeca-2,6,11-triene.

EXAMPLE 24

A mixture of 1 g. of methyl 10-oxo-3,11-dimethyl-7-ethyltrideca-2,6,11-trienoate, 60 ml. of methanol, 0.2 g. of sodium carbonate and 6 ml. of water is stirred at about 30° for 3 hours. The mixture is diluted with water, neutralized and then extracted with ether. The organic extracts are combined, washed with water, dried over sodium sulfate and evaporated at room temperature to yield 10-oxo-3,11-dimethyl-7-ethyltrideca-2,6,11-trienoic acid.

By use of the above procedure, each of the esters described herein are hydrolyzed to the free acid.

EXAMPLE 25

One gram of thionyl chloride is added with stirring at room temperature to 0.5 g. of 10-oxo-3,11-dimethyl-7-ethyltrideca-2,6,11-trienoic acid and the mixture heated at about 50° for 10 minutes. Excess thionyl chloride is removed by evaporation to yield 10-oxo-3,11-dimethyl-7-ethyltrideca-2,6,11-trienoyl chloride to which there is added t-butyl alcohol (about 2 equivalents) and the mixture heated at about 50° for 5 minutes. Excess t-butyl alcohol is removed by evaporation to yield t-butyl 10-oxo-3,11-dimethyl-7-ethyltrideca-2,6,11-trienoate.

Similarly, by using other alcohols in place of t-butyl alcohol in the above procedure, such as cyclohexyl alcohol, benzyl alcohol, cyclpentyl alochol, the corresponding esters are obtained.

EXAMPLE 26

To a solution of 0.5 g. of 10-oxo-3,11-dimethyl-7-ethyltrideca-2,6,11-trienoic acid in 15 ml. of benzene is added with stirring one molar equivalent of potassium bicarbonate. The mixture is stirred until the evolution of carbon dioxide ceases and then evaporated to yield potassium 10-oxo-3,11-dimethyl-7-ethyltrideca-2,6,11-trienoate.

Alternatively, acid salts can be prepared by titrating the acid with an organic solution of the metal base, e.g. methanolic solution of sodium methoxide.

EXAMPLE 27

Into a mixture of 2 g. of diethyl 10,11-oxido-3,7,11-trimethyltrideca-2,6-dienylphosphonate in 150 ml. of ether, there is introduced a slow stream of hydrogen chloride for 1 hour at 0° C. The mixture is then allowed to stand at 0° C. for 18 hours. Then the mixture is washed, dried over sodium sulfate and evaporated to yield diethyl 11-chloro-10-hydroxy-3,7,11-trimethyltrideca-2,6-dienylphosphonate which is purified by silica chromatography.

Using the above procedure, each of diethyl 10,11-oxido-3,11-dimethyl-7-ethyltrideca-2,6-dienylphosphonate, dimethyl 10,11-oxido-3,11-dimethyl-7-ethyltrideca-2,6-dienylphosphonate, diethyl 10,11-oxido-3,7,11-trimethyldodeca-2,6-dienylphosphonate and dimethyl 10,11-oxido-3,7,11-trimethyltrideca-2,6-dienylphosphonate is converted into diethyl 11-chloro-10-hydroxy-3,11-dimethyl-7-ethyltrideca-2,6-dienylphosphonate, dimethyl 11-chloro-10-hydroxy-3,11-dimethyl-7-ethyltrideca-2,6-dienylphosphonate, diethyl 11-chloro-10-hydroxy-3,7,11-trimethyldodeca-2,6-dienylphosphonate and dimethyl 11-chloro-10-hydroxy-3,7,11-trimethyltrideca-2,6-dienylphosphonate. Each of the 11-chloro-10-hydroxy compounds is oxidized using the procedure of Example 1 to yield diethyl 11-chloro-10-oxo-3,7,11-trimethyltrideca-2,6-dienylphosphonate, diethyl 11-chloro-10-oxo-3,11-dimethyl-7-ethyltrideca-2,6-dienylphosphonate, dimethyl-11-chloro-10-oxo-3,11-dimethyl-7-ethyltrideca-2,6-dienylphosphonate diethyl 11-chloro-10-oxo-3,7,11-trimethyldodeca-2,6-dienylphosphonate and dimethyl 11-chloro-10-oxo-3,7,11-trimethyltrideca-2,6-dienylphosphonate.

By use of the process of Example 9, each of the 11-chloro-10-oxo compounds are converted into diethyl 10-oxo-3,7,11-trimethyltrideca-2,6,11-trienylphosphonate and diethyl 10-oxo-11,11-methylene-3,7-dimethyltrideca-2,6-dienylphosphonate; diethyl 10-oxo-3,11-dimethyl-7-ethyltrideca-2,6,11-trienylphosphonate and diethyl 10-oxo-11,11-methylene-3-methyl-7-ethyltrideca-2,6-dienylphosphonate; dimethyl 10-oxo-3,11-dimethyl-7-ethyltrideca-2,6,11-trienylphosphonate and dimethyl 10-oxo-11,11-methylene-3-methyl-7-ethyltrideca-2,6-dienylphosphonate; diethyl 10-oxo-3,7,11-trimethyldodeca-2,6,11-trienylphosphonate; and dimethyl 10-oxo-3,7,11-trimethyltrideca-2,6,11-trienylphosphonate and dimethyl 10-oxo-11,11-methylene-3,7-dimethyltrideca-2,6-dienylphosphonate.

EXAMPLE 28

Using the procedure of Example 1, each of:
methyl 3,7-dimethyl-11,11-methylene-10-hydroxydodeca-2,6-dienoate,
methyl 3-methyl-7,7;11,11-bismethylene-6,10-dihydroxydodec-2-enoate,
methyl 3,7-dimethyl-11,11-methylene-10-hydroxytrideca-2,6-dienoate,
methyl 3-methyl-7-ethyl-11,11-methylene-10-hydroxytrideca-2,6-dienoate and
methyl 3-methyl-7,7-ethylidene-11,11-methylene-6,10-dihydroxytridec-2-enoate
to yield:
methyl 3,7-dimethyl-11,11-methylene-10-oxododeca-2,6-dienoate,
methyl 3-methyl-7,7;11,11-bismethylene-6,10-bisoxododec-2-enoate,
methyl 3,7-dimethyl-11,11-methylene-10-oxotrideca-2,6-dienoate
methyl 3-methyl-7-ethyl-11,11-methylene-10-oxotrideca-2,6-dienoate and
methyl 3-methyl-7,7-ethylidene-11,11-methylene-6,10-bisoxotridec-2-enoate.

The starting materials for this process are described in our application, Ser. No. 6,292, filed Jan. 27, 1970, the disclosure of which is incorporated by reference.

EXAMPLE 29

A mixture of 1 g. of 1-acetoxy-10-oxo-3,11-dimethyl-7-ethyltrideca-2,6,11-triene, 1 g. of potassium bicarbonate, 10 ml. of water and 90 ml. of methanol is stirred for about 12 hours. Then the solvent is evaporated and the concentrate washed. After drying, the solution is evaporated under reduced pressure to yield 10-oxo-3,11-dimethyl-7-ethyltrideca-2,6,11-trien-1-ol.

The term "cycloalkyl", as used herein, refers to a cycloalkyl group of four to eight carbon atoms, such as cyclopentyl and cyclohexyl. The term "aralkyl", as used herein, refers to an aralkyl group of seven to 12 carbon atoms, such as benzyl, phenylethyl, methylbenzyl and naphthylmethyl.

What is claimed is:

1. A compound selected from those of the formula (II):

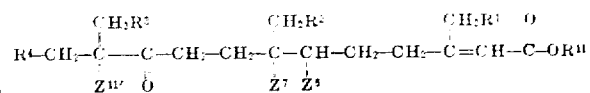

wherein,
each of $R^1$, $R^2$, $R^3$ and $R^4$ is hydrogen or lower alkyl;
$R^{11}$ is hydrogen or lower alkyl;
$Z^{11'}$ is bromo, chloro or fluoro; and
each of $Z^6$ and $Z^7$ is hydrogen or taken together form a carbon-carbon double bond between C-6,7.

2. A compound according to claim 1 wherein each of $R^1$, $R^2$, $R^3$ and $R^4$ is hydrogen or methyl.

3. A compound according to claim 2 wherein $Z^6$ and $Z^7$ taken together form a carbon-carbon double bond between C-6,7 and $Z^{11'}$ is fluoro or chloro.

4. A compound according to claim 2 wherein $Z^{11'}$ is bromo or chloro.

5. A compound according to claim 2 wherein $Z^{11'}$ is bromo or chloro and $Z^6$ and $Z^7$ taken together form a carbon-carbon double bond between C-6,7.

6. A compound according to claim 5 wherein $R^{11}$ is lower alkyl.

7. A compound according to claim 6 wherein $R^{11}$ is methyl or ethyl.

8. A compound according to claim 6 wherein $R^{11}$ is hydrogen.

9. A compound according to claim 6 wherein each of $R^1$ and $R^4$ is hydrogen and each of $R^2$ and $R^3$ is methyl.

10. A compound according to claim 9 wherein $Z^{11'}$ is chloro and $R^{11}$ is methyl or ethyl.

11. A compound according to claim 6 wherein each of $R^1$, $R^2$ and $R^4$ is hydrogen and $R^3$ is methyl.

12. A compound according to claim 11 wherein $Z^{11'}$ is chloro and $R^{11}$ is methyl or ethyl.

13. A compound according to claim 6 wherein $R^{11}$ is methyl; each of $R^1$ and $R^3$ is hydrogen; each of $R^2$ and $R^4$ is methyl; and $Z^{11'}$ is chloro.

* * * * *